(12) United States Patent
Nagai et al.

(10) Patent No.: US 7,159,482 B2
(45) Date of Patent: Jan. 9, 2007

(54) ELECTRIC ACTUATOR

(75) Inventors: Shigekazu Nagai, Adachi-ku (JP); Akio Saitoh, Kawaguchi (JP); Hiroshi Yumiba, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 282 days.

(21) Appl. No.: 10/600,710

(22) Filed: Jun. 23, 2003

(65) Prior Publication Data
US 2003/0233896 A1    Dec. 25, 2003

(30) Foreign Application Priority Data
Jun. 24, 2002  (JP) ............................. 2002-183313

(51) Int. Cl.
*F16H 25/24*    (2006.01)

(52) U.S. Cl. ..................................... 74/89.25; 74/89.37

(58) Field of Classification Search ............... 74/89.25, 74/89.29, 89.37, 89.31, 89.23, 89.4, 89.41, 74/89.35; 267/196, 134, 124
See application file for complete search history.

(56) References Cited

U.S. PATENT DOCUMENTS

| | | | | |
|---|---|---|---|---|
| 1,973,432 A | * | 9/1934 | Faudi | ........................ 267/124 |
| 2,403,092 A | * | 7/1946 | Lear | ........................... 74/89.26 |
| 2,476,376 A | * | 7/1949 | Laraque | ....................... 60/709 |
| 2,520,014 A | * | 8/1950 | Rehnberg et al. | ............. 318/39 |
| 2,590,251 A | * | 3/1952 | Hoover | ....................... 74/89.37 |
| 2,620,683 A | * | 12/1952 | Geyer | ..................... 74/665 Q |
| 2,667,953 A | | 2/1954 | Girswold | |
| 2,769,430 A | * | 11/1956 | Geyer | ........................ 60/698 |
| 3,053,104 A | * | 9/1962 | Scavini | ..................... 74/89.25 |
| 3,202,009 A | | 8/1965 | Geyer | |
| 3,281,138 A | * | 10/1966 | Oster | ........................ 267/124 |
| 3,693,254 A | | 9/1972 | Salonen | |
| 4,089,624 A | * | 5/1978 | Nichols et al. | ............. 417/362 |
| 4,745,815 A | * | 5/1988 | Klopfenstein | .............. 74/89.25 |
| 4,790,201 A | | 12/1988 | Gheddo | |
| 4,876,906 A | | 10/1989 | Jones | |
| 5,024,124 A | | 6/1991 | Popov et al. | |
| 5,042,885 A | | 8/1991 | Villec | |
| 5,865,272 A | * | 2/1999 | Wiggins et al. | ........... 185/40 R |
| 5,983,743 A | | 11/1999 | McGregor et al. | |

FOREIGN PATENT DOCUMENTS

| | | |
|---|---|---|
| DE | 31 42 950 | 6/1982 |
| DE | 89 11 260 | 2/1990 |
| FR | 2 739 428 | 4/1997 |
| GB | 2 087 485 | 5/1982 |

\* cited by examiner

*Primary Examiner*—Richard Ridley
*Assistant Examiner*—Justin Krause
(74) *Attorney, Agent, or Firm*—Paul A. Guss

(57) ABSTRACT

An electric actuator comprises a gear mechanism which transmits the rotary driving force of a rotary driving source, and a ball spline mechanism which includes a ball spline shaft provided movably back and forth from a connecting block to the outside and which converts a rotary motion transmitted by the gear mechanism into a rectilinear motion. The electric actuator has a ball spline nut which is externally fitted to the ball spline shaft to be meshed with the gear mechanism and which is integrally formed with a gear section having a plurality of teeth arranged circumferentially about the gear section.

8 Claims, 8 Drawing Sheets

ELECTRIC ACTUATOR

BACKGROUND OF THE INVENTION

1. Field of the Invention

The present invention relates to an electric actuator provided with a ball spline shaft which is movable back and forth from an actuator body to the outside, driven by a rotary driving source.

2. Description of the Related Art

Electric actuators have been used, for example, in order to transport workpieces or position workpieces. Such an electric actuator is provided with a motor, a ball screw shaft which is linearly and substantially coaxially connected with a drive shaft of the motor by a coupling member, and a slider which is displaceable in the axial direction by a nut member externally fitted to the ball screw shaft.

In this arrangement, the motor is driven and rotated, and the rotary driving force thereof is transmitted to the ball screw shaft. Accordingly, the slider is displaced by the nut member which is screw-engaged with the ball screw shaft.

However, in the conventional electric actuator, the drive shaft of the motor and the ball screw shaft are connected linearly and substantially coaxially by the coupling member. Therefore, the axial size of the electric actuator is obtained by adding the length of the ball screw shaft and the length of the drive shaft of the motor. Thus, it is impossible to reduce a size of the electric actuator in the axial direction.

In order to shorten the electric actuator in the axial direction, the drive shaft of the motor and the ball screw shaft are arranged substantially in parallel to one another while they are separated from each other by a predetermined distance. A gear mechanism having a plurality of gears is interposed between the drive shaft of the motor and the ball screw shaft to transmit the rotary driving force.

However, when the rotary driving force of the motor is transmitted to the ball screw shaft in this structure, it is necessary to establish the concentricity for the gear and the nut member which are formed as separate members and which are coaxially connected to one another. Therefore, the centering alignment operation is complicated.

SUMMARY OF THE INVENTION

A general object of the present invention is to provide an electric actuator which makes it possible to reduce the size in the axial direction and miniaturize the entire apparatus and also which makes it possible to dispense with the centering alignment operation for a gear section of a feed screw nut and assemble the apparatus easily.

According to the present invention, a gear section, in which a plurality of teeth are formed circumferentially, is integrally formed on a feed screw nut which is externally fitted to a feed screw shaft and which is meshed with a gear mechanism. Accordingly, it is unnecessary to perform the centering alignment operation, and the apparatus can be assembled conveniently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
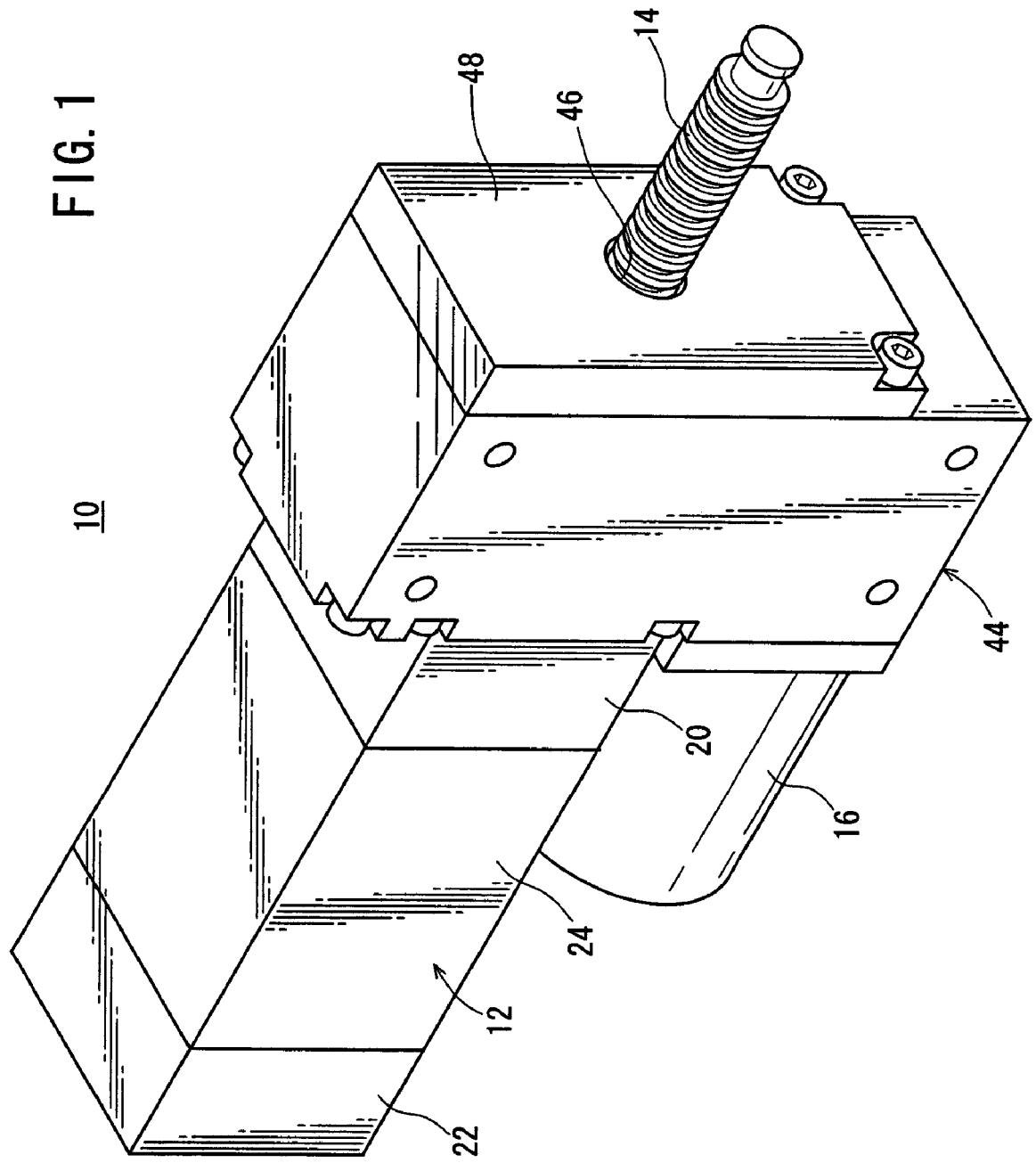
FIG. 1 is a perspective view illustrating an electric actuator according to an embodiment of the present invention.
Figure 2:
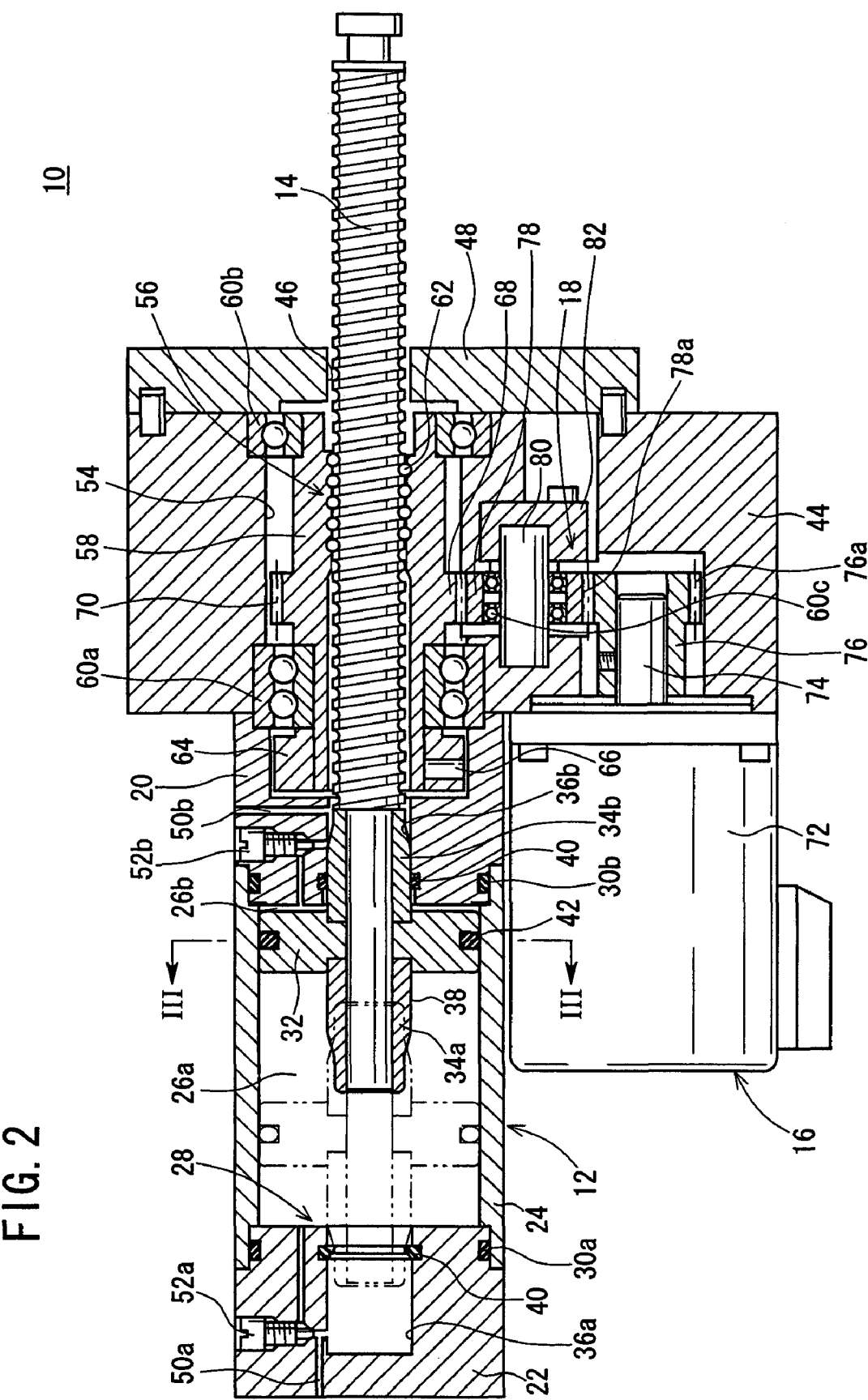
FIG. 2 is a longitudinal sectional view taken in the axial direction illustrating the electric actuator shown in FIG. 1.

With reference to FIGS. 1 and 2, reference numeral 10 indicates an electric actuator according to an embodiment of the present invention.

The electric actuator 10 comprises an actuator body 12 which functions as a main body unit, a ball spline shaft (feed screw shaft) 14 which is provided movably back and forth toward the outside from one end surface of the actuator body 12, a rotary driving source 16 which is arranged substantially in parallel to the axis of the ball spline shaft 14, and a gear mechanism 18 (see FIG. 2) which transmits the rotary driving force of the rotary driving source 16 to the ball spline shaft 14.

The actuator body 12 includes a cushion mechanism 28 which has closed cushion chambers 26a, 26b formed therein by connecting a tube member 24 between a rod cover 20 disposed on one end and a head cover 22 disposed on the other end. Seal members 30b, 30a for air-tightness are installed to connecting portions between the tube member 24 and the rod cover 20, and the tube member 24 and the head cover 22, respectively.

As shown in FIG. 2, the cushion mechanism 28 includes a piston 32 and a pair of collar members 34a, 34b. The piston 32 is connected to one end of the ball spline shaft 14, and is displaceable together with the ball spline shaft 14. The piston 32 is slidable along the inner wall surface of the tube member 24. The pair of collar members 34a, 34b fix the ball spline shaft 14 to the piston 32 by supporting both sides of the piston.

Figure 3:
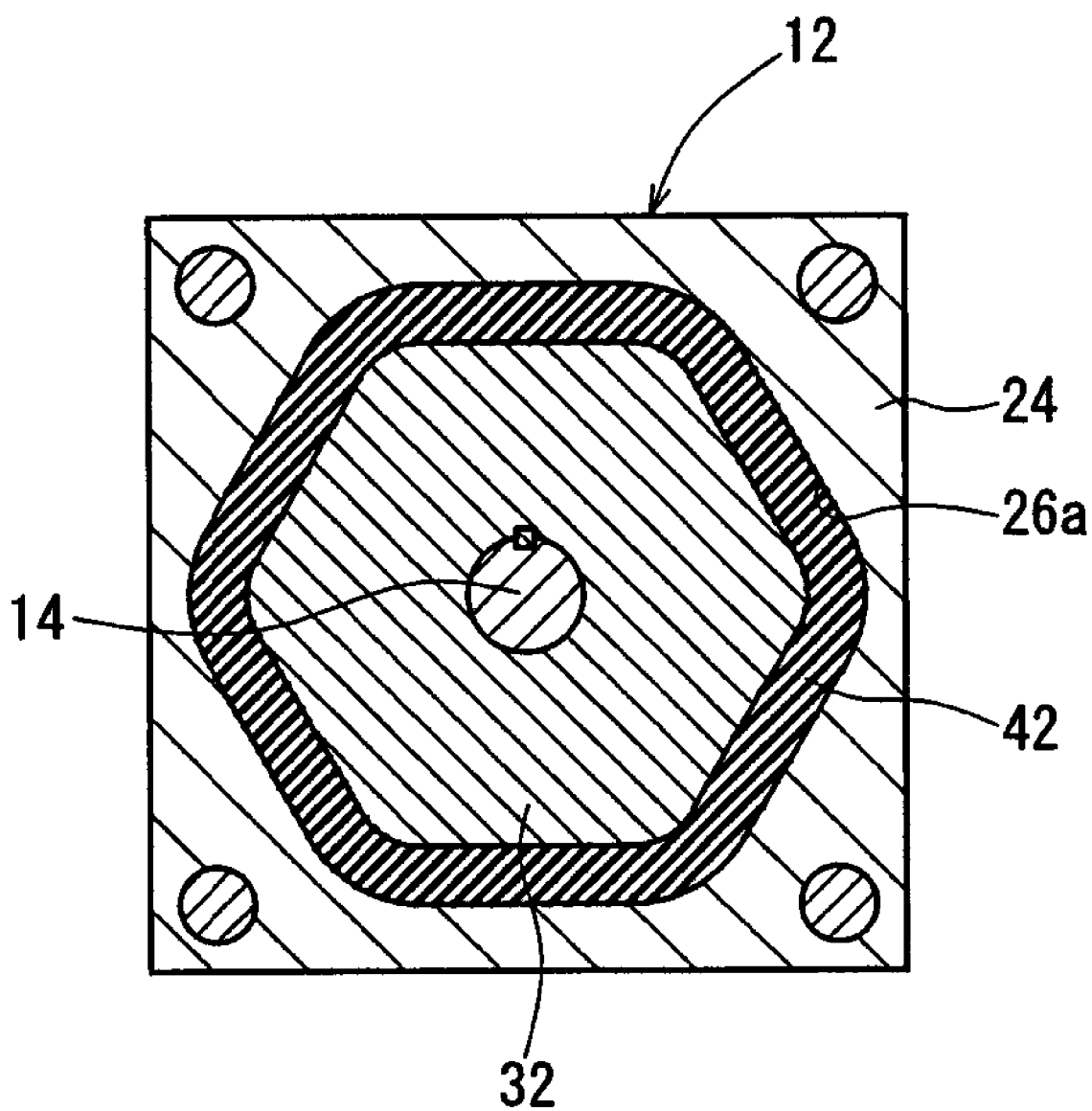
FIG. 3 is a vertical sectional view taken along a line III—III shown in FIG. 2.

As shown in FIG. 3, the outer circumferential surface of the piston 32 is formed so that the piston 32 is a substantially hexagonal cross-sectional shape. The piston 32 slides along the inner wall surface of the tube member 24 having the shape corresponding to the cross-sectional shape of the piston 32. Accordingly, the rotation of the piston 32 is prevented.

Holes 36a, 36b are formed in the head cover 22 and the rod cover 20, respectively. The collar members 34a, 34b are capable of entering holes 36a, 36b, respectively, when the piston 32 and the ball spline shaft 14 are displaced. Cushion packings 40 are installed to the holes 36a, 36b for sealing, by surrounding large diameter sections 38 of the collar members 34a, 34b.

A piston packing 42 having a substantially hexagonal cross-sectional shape is installed to an annular groove formed on the outer circumferential surface of the piston 32. The piston packing 42 separates one cushion chamber 26a from the other cushion chamber 26b.

The actuator body 12 has a rectangular parallelepiped-shaped connecting block 44 which is connected to the rod cover 20. A cover plate 48 is connected to one side surface of the connecting block 44. The cover plate 48 has a hole 46, and the ball spline shaft 14 is inserted through the hole 46.

First and second communication passages 50a, 50b are formed in the head cover 22 and the rod cover 20. The cushion chamber 26a communicates with the atmospheric air through the first communication passages 50a, while the cushion chamber 26b communicates with the atmospheric air through the second communication passages 50b. First and second cushion valves 52a, 52b, are arranged at intermediate positions of the first and second communication passages 50a, 50b respectively for adjusting the flow rates of the air to be discharged to the atmospheric air through the first and second communication passages 50a, 50b, respectively.

In this arrangement, the screwing amounts of screw portions of the first and second cushion valves 52a, 52b into screw holes of the head cover 22 and the rod cover 20 are increased to appropriately set the cross-sectional areas of the first and second communication passages 50a, 50b. Accordingly, the flow rates of the air to be discharged to the atmospheric air through the first and second communication passages 50a, 50b are throttled. Thus, it is possible to obtain the desired air cushion force in the vicinity of the end of displacement of the piston 32.

A chamber 54 is formed in the connecting block 44, and penetrates in the axial direction of the ball spline shaft 14. A ball spline mechanism (feed screw mechanism) 56 is arranged in the chamber 54. The ball spline mechanism 56 includes a ball spline shaft 14, a cylindrical ball spline nut (feed screw nut) 58, first and second bearings 60a, 60b, and a plurality of balls 62. The ball spline shaft 14 is provided movably back and forth toward the outside through the hole 46 of the cover plate 48. The cylindrical ball spline nut 58 surrounds a part of the outer circumferential surface of the ball spline shaft 14. The first and second bearings 60a, 60b are arranged at one end and the other end of the ball spline nut 58, respectively, and rotatably support the ball spline nut 58. The plurality of balls 62 roll along ball-rolling grooves formed on the ball spline shaft 14 and the ball spline nut 58.

A bearing-holding member 64 is provided in the vicinity of the first bearing 60a, and is fitted to the end of the ball spline nut 58. The rotation-preventive function is effected for the bearing-holding member 64 by the a pin member 66. An annular projection 68 is integrally formed at a central portion of the outer circumferential surface of the ball spline nut 58 which is formed to be cylindrical. A gear section 70 is provided on the circumferential surface of the annular projection 68, and has a plurality of teeth formed continuously and circumferentially.

The rotary driving source 16 has a holder 72. One end of the holder 72 is fastened to the connecting block 44 by unillustrated screw members. The rotary driving source 16 has a rotary driving shaft 74 which is arranged substantially in parallel to the axis of the ball spline shaft 14. A first gear 76 is coaxially connected to the rotary driving shaft 74. A second gear 78 is rotatably supported by a pin member 80 between the first gear 76 and the ball spline shaft 14. The second gear 78 has teeth 78a to be meshed with the teeth 76a of the first gear 76 and also meshed with the gear section 70 of the ball spline nut 58.

A third bearing 60c is arranged between the pin member 80 and the second gear 78. The second gear, 78 is rotatably retained by the third bearing 60c. One end of the pin member 80 is axially attached to a hole which is formed on the connecting block 44. The other end of the pin member 80 is axially attached to a bearing block 82 which is fixed to the connecting block 44 by screw members.

The electric actuator 10 according to the embodiment of the present invention is basically constructed as described above. Next, its operation, function, and effect will be explained.

Figure 4:
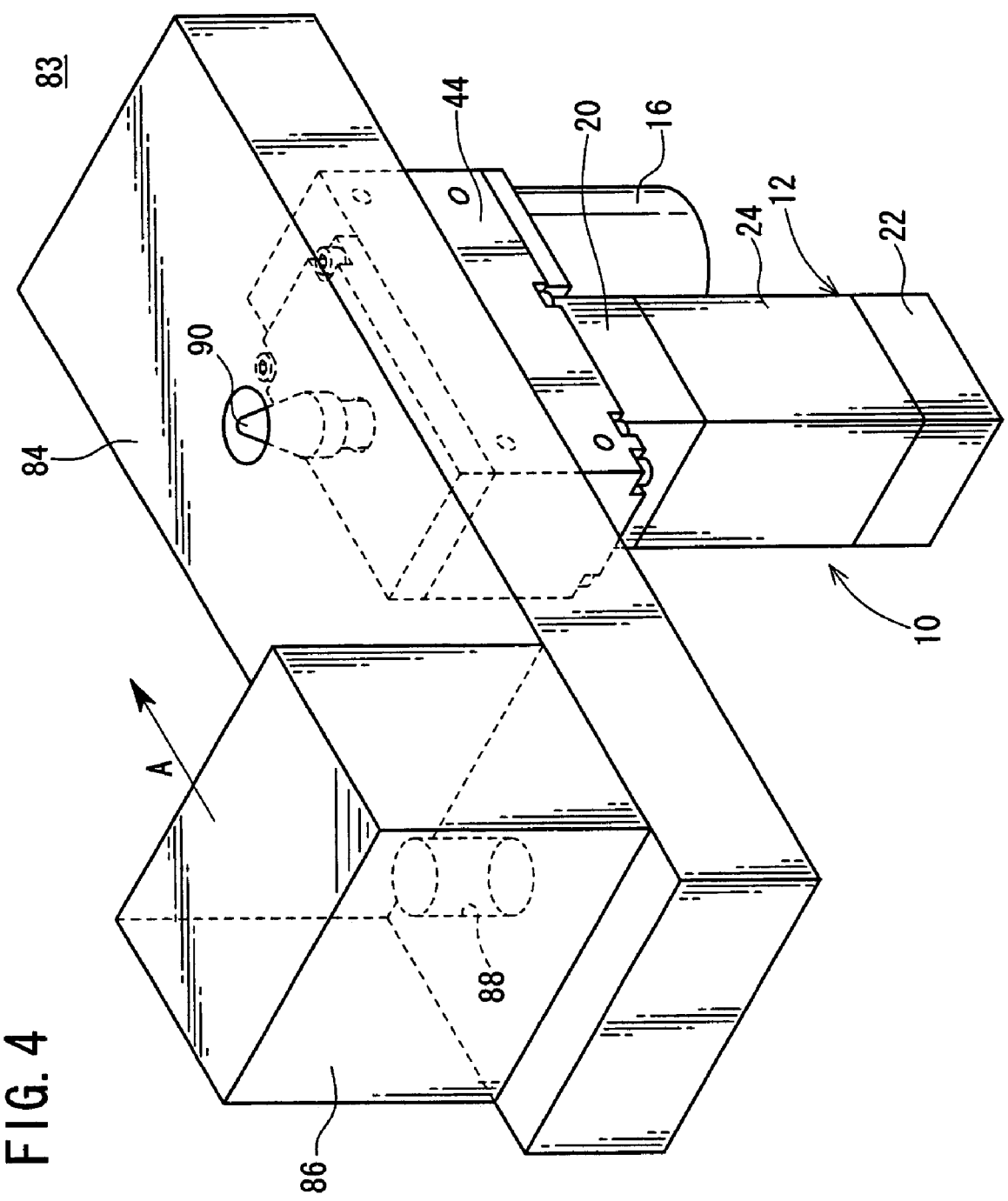
FIG. 4 is a perspective view illustrating the application of the electric actuator shown in FIG. 1 to a positioning apparatus.

FIG. 4 shows a workpiece-positioning apparatus 83 to which the electric actuator 10 according to the embodiment of the present invention is applied. An explanation will be made about the operation in which a stopper pin 90 is inserted into a positioning hole 88 of a workpiece 86 transported in the direction of the arrow A on a transport passage 84. Then, the workpiece 86 is stopped, so that the workpiece 86 is positioned at a predetermined position on the transport passage 84.

The stopper pin 90 having a tapered surface is connected to one exposed end of the ball spline shaft 14. The electric actuator 10 is fixed on the lower side of the transport passage 84 by an unillustrated fixing means. The following explanation will be made assuming that the initial position is defined when the piston 32 is disposed on the side of the head cover 22.

At the initial position, an unillustrated power source is energized to drive and rotate the rotary driving source 16. The first gear 76 connected to the rotary driving shaft 74 of the rotary driving source 16 is rotated about the rotation center of the rotary driving shaft 74. The second gear 78 meshed with the first gear 76 is rotated in a direction opposite to the direction of the first gear 76.

The second gear 78 is rotatably supported by the pin member 80, and is meshed with the gear section 70. The gear section 70 is integrally formed on the outer circumferential surface of the ball spline nut 58. The gear section 70 is rotated integrally with the ball spline nut 58. When the ball spline nut 58 rotatably supported by the first and second bearings 60a, 60b is rotated, the ball spline shaft 14 is moved upwardly by the rotation of the plurality of balls 62. Therefore, the piston 32 connected to the lower portion of the ball spline shaft 14 is also moved upwardly together with the ball spline shaft 14.

When the ball spline shaft 14 is moved upwardly, the piston 32 slides along the inner wall surface of the tube member 24 to guide the ball spline shaft 14 in the linear direction (guiding function) and to prevent the piston 32 from rotating (rotation-prevention function) (see FIG. 3).

The upwardly moving ball spline shaft 14 penetrates through the transport passage 84, and the stopper pin 90 on one end of the ball spline shaft 14 is inserted into the positioning hole 88 which is formed on the bottom surface of the workpiece 86. Accordingly, the workpiece 86 is stopped, and the workpiece 86 is positioned at the predetermined position.

The cushion valve 52b throttles the flow rate of the air to be discharged to the outside from the upper cushion chamber 26b by the cushion mechanism 28 when the piston 32 arrives at one end of the displacement. Accordingly, shock is absorbed (buffering function) when the piston 32 arrives at the one end of the displacement.

When the polarity of the current supplied to the rotary driving source 16 is reversed to the above, then the rotary driving shaft 74 is rotated in a direction opposite to the above, and the ball spline shaft 14 and the piston 32 are moved downwardly together to be restored to the initial position.

When restored to the initial position, the cushion valve 52a throttles the flow rate of the air discharged to the outside from the lower cushion chamber 26a by the cushion mechanism 28. Accordingly, shock is absorbed (buffering function) when the piston 32 arrives at the other end of the displacement.

Figure 5:
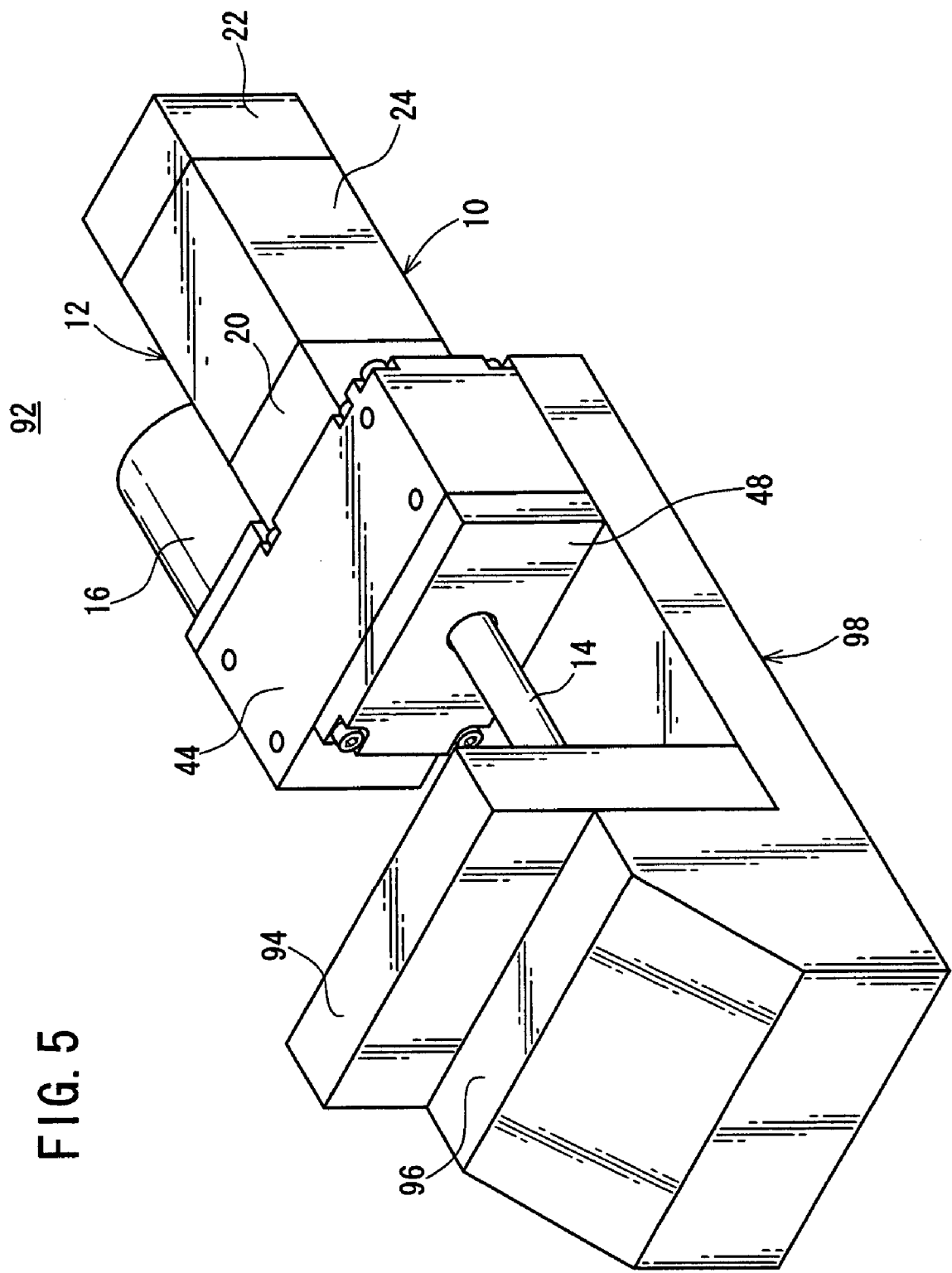
FIG. 5 is a perspective view illustrating the application of the electric actuator shown in FIG. 1 to a clamp apparatus.

Next, FIG. 5 shows that the electric actuator 10 according to the embodiment of the present invention is applied to a clamp apparatus 92. The clamp apparatus 92 includes a clamp stand 98 on which a clamp plate 94 is connected to one end of the ball spline shaft 14. The clamp apparatus 92 has a clamp section 96 formed for supporting an unillustrated workpiece by the displacement of the clamp plate 94.

The ball spline shaft 14 can be displaced toward the clamp section 96 under the driving action of the rotary driving source 16 to support or interpose the unillustrated workpiece between the clamp section 96 and the clamp plate 94 which is connected to one end of the ball spline shaft 14.

In the electric actuator 10 according to the embodiment of the present invention, the gear mechanism 18 functions between the rotary driving source 16 and the ball spline shaft 14, and the plurality of teeth are formed on the annular projection 68 formed on the outer circumferential surface of the ball spline nut 58 so that the gear section 70 is provided integrally with the ball spline nut 58. Accordingly, it is unnecessary to perform the centering alignment operation for establishing the concentricity between the ball spline nut 58 and the gear section 70.

Therefore, in the embodiment of the present invention, the assembling can be conveniently performed, because it is unnecessary to perform the centering alignment operation. Further, it is possible to reduce production cost.

Figure 6:
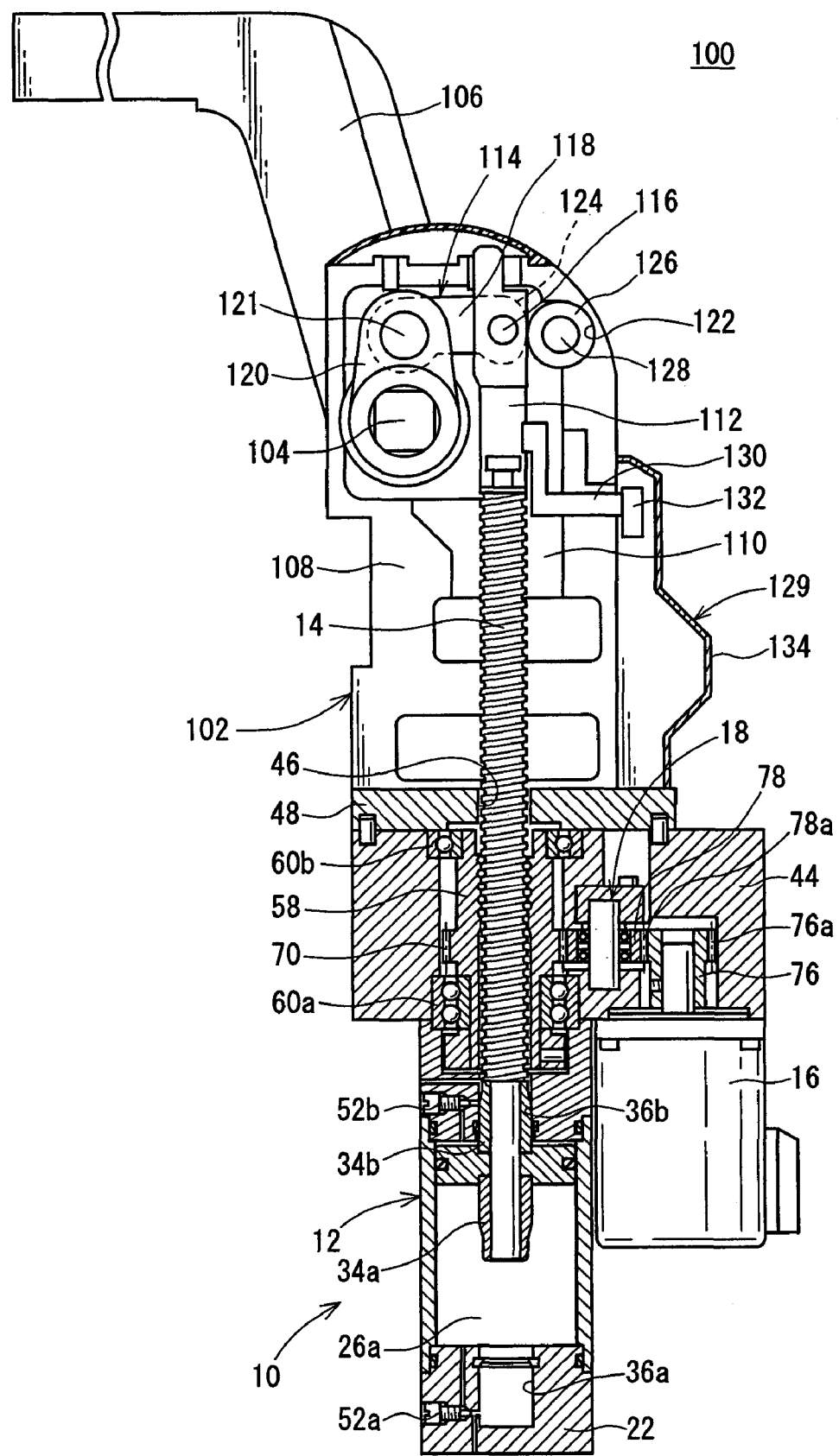
FIG. 6 is a partial longitudinal sectional view illustrating the application of the electric actuator shown in FIG. 1 to another clamp apparatus.

Next, FIG. 6 shows that the electric actuator 10 according to the embodiment of the present invention is applied to another clamp apparatus 100.

The clamp apparatus 100 comprises a clamp body 102, and an arm 106 which is connected to bearing sections 104 having a rectangular cross-sectional shape protruding to the outside through a pair of substantially circular openings (not shown) formed through the clamp body 102.

The clamp body 102 is constructed by integrally assembling a first casing 108 and an unillustrated second casing. A chamber 110 is defined in the clamp body 102 by recesses formed on the first casing 108 and the second casing. The free end of the ball spline shaft 14 faces the chamber 110.

A toggle link mechanism 114 is provided at the free end of the ball spline shaft 14 for converting the rectilinear motion of the ball spline shaft 14 into the rotary motion of the arm 106 by a knuckle joint 112.

The toggle link mechanism 114 includes a link plate 118 which is connected to the knuckle joint 112 by a first pin member 116, and a support lever 120 which is rotatably supported by a pair of substantially circular openings formed in the first casing 108 and the second casing.

The link plate 118 is interposed between the knuckle joint 112 and the support lever 120, and it links the knuckle joint 112 with the support lever 120.

The support lever 120 is connected to the link plate 118 by a second pin member 121. The support lever 120 has the bearing sections 104 having rectangular cross-sectional shapes which are formed to protrude in the direction substantially perpendicular to the axis of the ball spline shaft 14 (direction substantially perpendicular to the plane of the figure). The bearing sections 104 are exposed from the clamp body 102 through the unillustrated openings.

Recesses 122 having circular arc-shaped cross sections are formed on the upper side of the inner wall surfaces of the first casing 108 and the second casing of the clamp body 102. A guide roller 126 is provided in the recesses 122, and the guide roller 126 is rotatable by a predetermined angle in contact with a curved surface 124 of the link plate 118. A pin member 128 is secured to holes which are formed on the first casing 108 and the second casing, for rotatably supporting the guide roller 126. A plurality of needle bearings (not shown) are installed to a through-hole of the guide roller 126 circumferentially. The guide roller 126 smoothly rotates under the rolling action of the needle bearings.

A position-detecting mechanism 129 is provided for the first casing 108 and the second casing, for detecting the displacement of the ball spline shaft 14. The position-detecting mechanism 129 includes a detected element 132 which is displaceable together with the ball spline shaft 14 by an attachment fixture 130, and a pair of detection elements (not shown) which are installed to a casing 134 and which are spaced from each other by a predetermined distance.

In this arrangement, the rectilinear motion of the spline shaft 14 by the rotary driving force of the rotary driving source 16 is transmitted via the knuckle joint 112 to the toggle link mechanism 114. The linear motion is converted into the rotary motion of the arm 106 under the rotary action of the support lever 120 of the toggle link mechanism 114.

That is, the rectilinear motion (upward movement) of the ball spline shaft 14 causes force to press the knuckle joint 112 and the link plate 118 upwardly. The pressing force exerted on the link plate 118 rotates the link plate 118 by a predetermined angle about the support point of the first pin member 116. Further, the support lever 120 is rotated by linking relationship with the link plate 118.

Therefore, the arm 106 is rotated counterclockwise by a predetermined angle about the fulcrum of the bearing sections 104 of the support lever 120.

When the arm 106 is rotated counterclockwise as described above, the curved surface 124 of the link plate 118 contacts the guide roller 126. The guide roller 126 is rotated about the center of the pin member 128 keeping in contact with the curved surface 124.

The arm 106 is further rotated to abut against an unillustrated workpiece. Accordingly, the rotation action of the arm 106 is stopped. As a result, the workpiece is clamped by the arm 106 (clamp state).

Subsequently, when the arm 106 is separated from the workpiece to release the workpiece from the clamp state, the polarity of the current supplied to the rotary driving source 16 is reversed to the above to move the ball spline shaft 14 downwardly. Accordingly, the arm 106 is rotated clockwise, and restored to the initial position Next, FIG. 7 shows that the electric actuator 10 according to the embodiment of the present invention is applied to still another clamp apparatus 150.

In the clamp apparatus 150, one end of a connecting member 152 is connected to one end of the ball spline shaft 14 by a connecting bolt 154. A cylindrical shaft 156 is connected substantially in parallel to the ball spline shaft 14 on the other end of the connecting member 152. A gripping member 158 is connected to the lower end of the shaft 156, which abuts against a workpiece in clamping the unillustrated workpiece.

Figure 7:
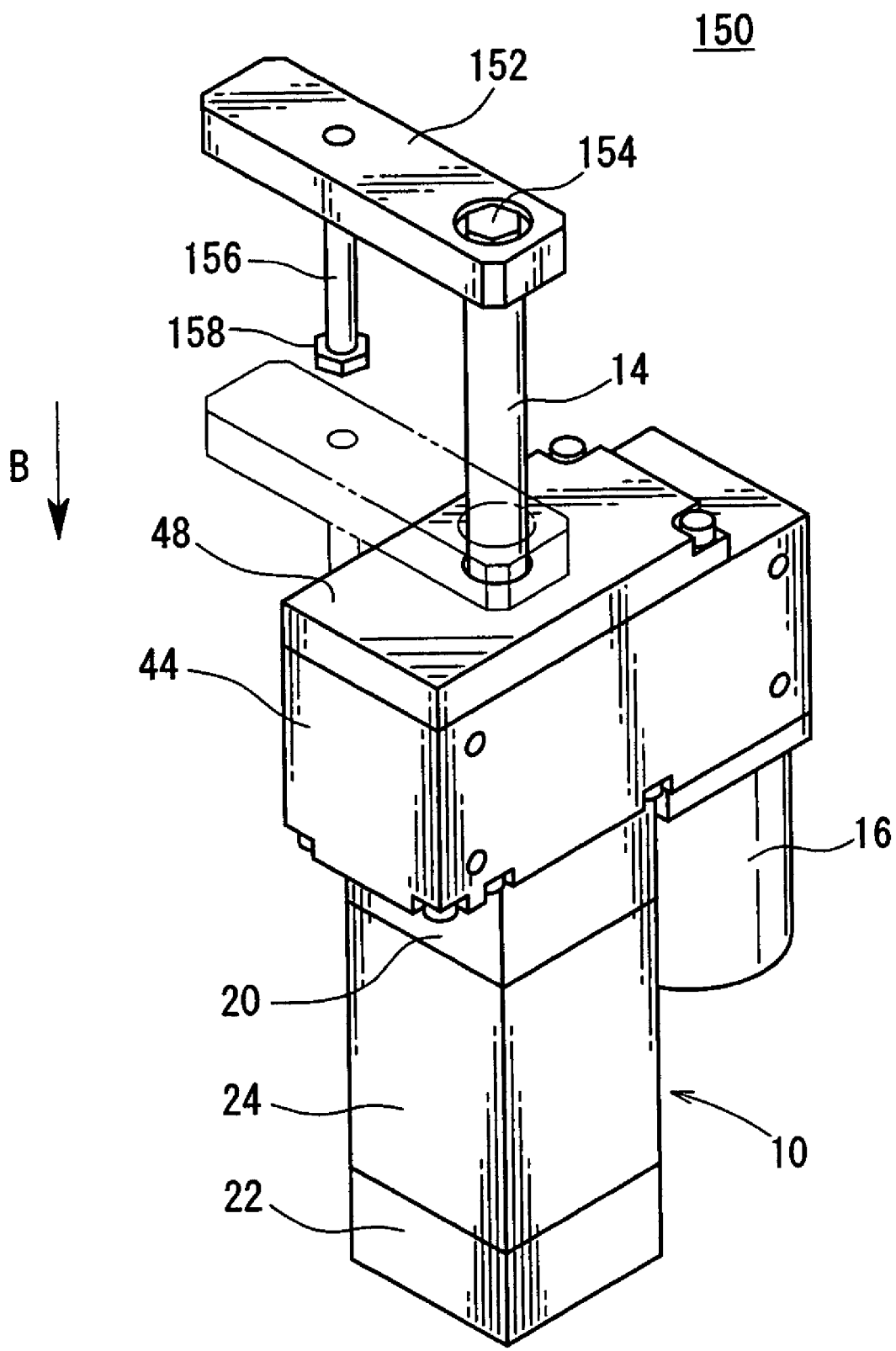
FIG. 7 is a perspective view illustrating the application of the electric actuator shown in FIG. 1 to still another clamp apparatus.

The ball spline shaft 14 is displaced in the direction (direction of the arrow B) toward the cover plate 48 when driven by the rotary driving source 16, causing the clamp state in which the unillustrated workpiece is clamped by the gripping member 158 of the shaft 156 connected to the connecting member 152 (see two-dot chain lines in FIG. 7).

When the gripping member 158 is separated from the workpiece to release the workpiece from the clamp state, the polarity of the current supplied to the rotary driving source 16 is reversed to the above to displace the ball spline shaft 14 upwardly. Accordingly, the gripping member 158 is separated from the workpiece together with the shaft 156.

Figure 8:
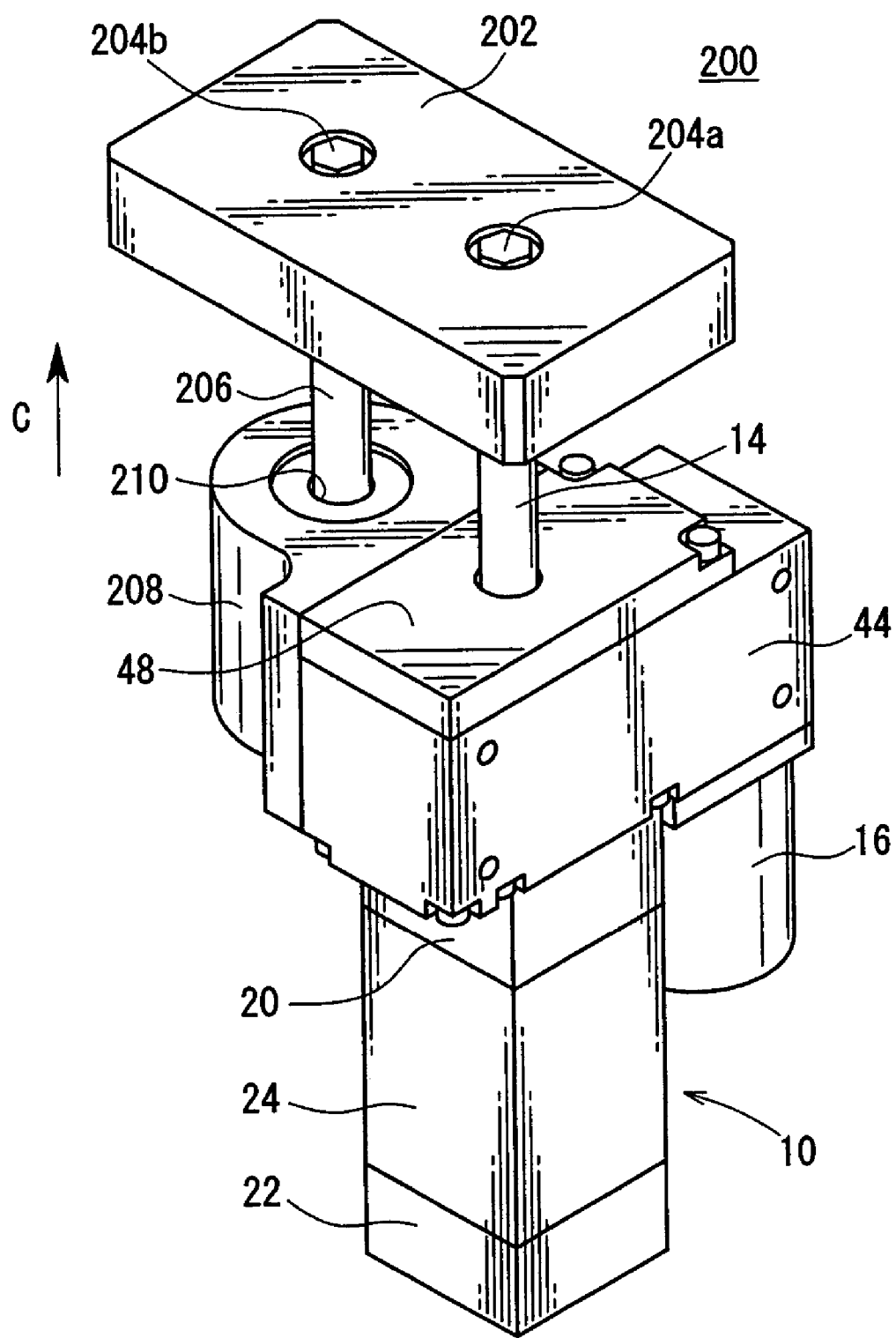
FIG. 8 is a perspective view illustrating the application of the electric actuator shown in FIG. 1 to a lift apparatus.

Next, FIG. 8 shows a state in which the electric actuator 10 according to the embodiment of the present invention is applied to a lift apparatus 200.

In the lift apparatus 200, a substantially rectangular table plate 202 is integrally connected to one end of the ball spline shaft 14 by a connecting bolt 204a. A guide shaft 206 is connected to the table plate 202. The guide shaft 206 is substantially in parallel to the ball spline shaft 14 while being spaced from the ball spline shaft 14 by a predetermined distance. The guide shaft 206 is connected to the table plate 202 by a connecting bolt 204b.

The lower end of the guide shaft 206 is inserted into a guide hole 210 of a guide member 208 which is installed to the side surface of the connecting block 44. The guide shaft 206 is supported in the axial direction by the guide hole 210.

The ball spline shaft 14 is displaced in the direction (direction of the arrow C) to separate from the cover plate 48 when driven by the rotary driving source 16. An unillustrated workpiece placed on the table plate 202 connected to the ball spline shaft 14 can be transported to a predetermined upward position. During this operation, the table plate 202 can be correctly displaced in the axial direction under the guiding action of the guide shaft 206 which is moved along the guide hole 210.

As described above, by the electric actuator 10 according to the embodiment of the present invention, it is possible to construct the clamp apparatuses 92, 100, 150 and the lift apparatus 200 easily. Further, it is possible to miniaturize the entire apparatus by reducing the size in the axial direction of each of the clamp apparatuses 92, 100, 150 and the lift apparatus 200.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An electric actuator comprising:
    a main body unit;
    a rotary driving source which is connected substantially in parallel to an axis of said main body unit and which is driven and rotated in accordance with an electric signal;
    a gear mechanism which transmits rotary driving force of said rotary driving source; and
    a feed screw mechanism which converts rotary motion transmitted by said gear mechanism into rectilinear motion and which includes a feed screw shaft provided movably back and forth within said main body unit and projecting outside of said main body unit,
    said feed screw mechanism including a feed screw nut which is externally fitted to said feed screw shaft to be meshed with said gear mechanism and which is integrally formed with a gear section having a plurality of teeth arranged circumferentially about said gear section,
    wherein said main body unit includes a tube member and a pair of cover members which are connected to both ends of said tube member, and a piston, which is slidably displaceable along an inner wall surface of said tube member, is connected to an end of said feed screw shaft, and
    wherein said piston is supported between a pair of collar members, holes are formed in said pair of cover members, and said collar members are capable of entering said holes.

2. The electric actuator according to claim 1, wherein said main body unit is provided with a cushion mechanism which absorbs shock axerted on said piston when said piston arrives at an end of displacement.

3. The electric actuator according to claim 2, wherein said cushion mechanism is provided with cushion chambers which are compressed by said piston, and said cushion mechanism has cushion valves which adjust flow rates of air discharged from said cushion chambers to the atmosphere.

4. The electric actuator according to claim 1, wherein cushion packings are installed to said holes for sealing function by surrounding outer circunferential surfaces of said collar members.

5. The electric actuator according to claim 1, wherein said gear mechanism includes a first gear and a second gear, said first gear is coaxially connected to a rotary driving shaft of said rotary driving source disposed in parallel to an axis of said feed screw shaft, said second gear is provided between said first gear and said feed screw shaft, teeth of said second gear is meshed with teeth of said first gear, and said gear section of said feed screw nut meshes with said teeth of said second gear.

6. The electric actuator according to claim 1, wherein a first bearing and a second bearing are arranged at one end and the other end of said feed screw nut, respectively, for rotatably supporting said feed screw nut.

7. The electric actuator according to claim 1, wherein said gear section is provided on a circumferential surface of an annular projection which is integrally formed at a central portion of an outer circumferential surface of said feed screw nut.

8. The electric actuator according to claim 1, wherein said piston has a polygonal cross-sectional shape, and said piston slides along said inner wall surface of said tube member having a shape corresponding to said cross-sectional shape of said piston, thereby preventing said piston from rotation.

* * * * *